United States Patent van der Wilk et al.

[11] Patent Number: 5,573,173
[45] Date of Patent: Nov. 12, 1996

[54] VACUUM TUBE COMPRISING A CERAMIC ELEMENT AND A METHOD OF INTERCONNECTING A CERAMIC ELEMENT AND A CONDUCTIVE ELEMENT

[75] Inventors: Ronald van der Wilk; Theodorus H. M. Stevens; Josephus J. van Moorsel, all of Eindhoven, Netherlands

[73] Assignee: U.S. Philips Corporation, New York, N.Y.

[21] Appl. No.: 487,618

[22] Filed: Jun. 7, 1995

Related U.S. Application Data

[62] Division of Ser. No. 146,513, Nov. 1, 1993, Pat. No. 5,479,067.

[30] Foreign Application Priority Data

Nov. 2, 1992 [EP] European Pat. Off. .............. 92203361

[51] Int. Cl.⁶ ........................................................ H01J 9/18
[52] U.S. Cl. ........................ 228/194; 228/262.21; 445/34
[58] Field of Search .................................. 228/193, 194, 228/262.21; 445/34

[56] References Cited

U.S. PATENT DOCUMENTS 3,789,499  2/1974  Pequignot ............................... 228/193
4,837,928  6/1989  Trevison et al. ..................... 228/194 X Primary Examiner—Kenneth J. Ramsey
Attorney, Agent, or Firm—Robert J. Kraus

[57] ABSTRACT

Vacuum tube comprises a ceramic element and method of interconnecting a ceramic element and a conductive element. A conductive connection consisting of a first layer containing silver and a filler and a second layer containing silver, gold or copper is formed between the ceramic element and the conductive element. The two above-mentioned layers are bonded together by means of diffusion bonding.

16 Claims, 3 Drawing Sheets

VACUUM TUBE COMPRISING A CERAMIC ELEMENT AND A METHOD OF INTERCONNECTING A CERAMIC ELEMENT AND A CONDUCTIVE ELEMENT

This application is a division of U.S. application Ser. No. 08/146,513, filed Nov. 1, 1993, now U.S. Pat. No. 5,479,067 and all benefits of such earlier applications are hereby claimed for this new divisional.

The invention relates to a vacuum tube comprising a ceramic element to which a layer is applied, a conductive element and a connection between the layer and the conductive element.

Vacuum tubes are used, inter alia, in television receivers, computer monitors and oscilloscopes.

A vacuum tube of the type mentioned in the first paragraph is known from U.S. Pat. No. 4,298,818. In this Patent the ceramic element consists of a ceramic support, the layer consists of a metallized pattern on the ceramic support and the conductive element is an electrode of the electron gun, and the connection is formed by a soldered joint between the electrode of an electron gun and the metallized pattern.

During the various steps in the manufacture of vacuum tubes temperatures up to approximately 400° C. occur. Such temperatures may cause damage to the soldered joint between the electrode and the metallized pattern and may lead to a breakdown of the vacuum tube. At such temperatures it is also possible that a soldered joint releases gases causing the gas pressure in the vacuum tube to rise, which adversely affects the life cycle of the vacuum tube. Moreover, soldering is a relatively time-consuming and costly process. Hereinbelow, the term "conductive" is to be understood to mean electrically conductive, unless stated otherwise.

It is an object of the invention to provide a vacuum tube having such a connection between the ceramic element and the conductive element that one or more than one of the above problems are reduced.

To this end, the vacuum tube according to the invention is characterized in that the assembly of the layer and the connection comprises a first layer, consisting if a first metal and a filler, and a second layer consisting of a second metal, the first and the second layer being bonded together by means of a diffusion bond.

Such diffusion bond can withstand the above-mentioned temperatures and gasses hardly if at all.

Preferably, the first and the second metal are elements of the group consisting of copper, gold and silver. In this case, diffusion bonding at relatively low temperatures is possible.

A preferred embodiment of the invention is characterized in that the first and the second metal are elements of the group consisting of silver and gold. Such elements are not subject to oxidation, resulting in an improved bond between the first and the second layer and simplifying the process of forming the diffusion bond.

The first and the second metal may be identical, for example silver, however they may also be different, for example silver and gold.

The first layer which comprises a first metal and a filler can be provided in a simple manner, for example by screen printing or stamping a first layer of metal-containing glass paste which is subsequently annealed. The filler in the first layer is, for example, glass. The second layer which comprises the second metal is, for example, a metal layer which is provided by means of, for example, electrodeposition or vacuum evaporation. The glass paste may contain, for example, silver and the second layer may contain copper.

If the first and the second layer are pressed together at a temperature of, for example, approximately 400°–500° C., the first metal, for example silver, of the first layer and the second metal, for example copper, of the second layer form a diffusion bond. A diffusion bond can withstand high temperatures.

Preferably, the first layer is applied to the ceramic material.

Advantageously, the first layer is applied to the ceramic element so that the difference between the coefficients of thermal expansion of the first layer and the ceramic element is generally relatively small. Thus, relatively small thermal stresses occur between the first layer and the ceramic element. Consequently, the risk that the first layer becomes detached from the ceramic dement is small. If the tiller contains glass, then the first layer is generally annealed at high temperatures (of the order of 500° C.–900° C.) after it has been provided. The ceramic element can withstand such temperatures. Preferably, the filler also serves as an adhesive for bonding the first layer to the ceramic element. Oxides, for example glass, are preferred. Oxides bond well to ceramic materials.

The invention is not limited to an assembly comprising one first layer and one second layer. The above-mentioned first and second layers need not be similar in form. The ceramic element may be provided with a plurality of first layers and/or a plurality of second layers. More than one second or first layer may be bonded to one and the same first or second layer, respectively, for example to provide one first layer with conductive connections to more than one conductive element.

In an embodiment, the vacuum tube is a cathode ray tube comprising an electron gun for generating at least one electron beam, and the electron gun comprises the ceramic element.

In the manufacture of cathode ray tubes the electron gun is accommodated in the cathode ray tube and during further manufacturing steps temperatures up to 400° C. occur. Particularly in the case of an electron gun it is important that a connection is formed which, also at such temperatures, does not adversely affect the vacuum in the cathode ray tube. Soldered joints may cause gas. Electron guns comprise one or more than one cathodes. The life cycle of these cathodes may be influenced substantially by residual gases in the cathode ray tube, and even more so if the residual gases are produced in the vicinity of the cathodes. Further, it is noted that soldered joints must be made of types of solder which melt at much higher temperatures than the above-mentioned 400° C., in order to preclude that the connection formed is damaged during the manufacture of the cathode ray tube. Thus, during the formation of the connection the temperature is high. During cooling thermal stresses occur which may cause, for example, warping of electrodes of the electron gun. This leads to changes in the distance between the electrodes, which adversely affects the quality of the electron gun.

In an embodiment, the electron gun comprises a first and a second electrode and the portions of the ceramic element facing the first and the second electrode are provided with the first layer and the sides of the first and the second electrode facing the ceramic element are provided with the second layer.

The first and the second electrode are interconnected in a simple manner and in such a way as to be resistant to high temperatures by means of the diffusion bonds with the ceramic element. The distance between the first and the second electrode can be very accurately predetermined.

The first and the second electrode can both be connected to the same side of the ceramic element, but preferably the ceramic element extends between the two electrodes. This enables the distance between the electrodes to be even more accurately determined.

In a further embodiment the ceramic element extends between the $G_1$ electrode and the $G_2$ electrode of the electron gun and is connected to both.

Changes in the distance between the $G_1$ electrode and the $G_2$ electrode may cause problems referred to as microphonics. In particular a change of the distance between the $G_1$ electrode and the $G_2$ electrode has relatively great consequences for the shape of the beam. This problem has largely been solved by the rigid connection formed by the ceramic element between these electrodes.

In an embodiment, the first layer is conductively connected to a resistance pattern on the ceramic element, the vacuum tube comprises means for applying at least two voltages to the resistance pattern and the second layer is connected to a conductive connection element between the second layer and the electrode.

A voltage divider can be formed by means of a resistance pattern and the means for applying at least two voltages. By virtue thereof, the number of electric voltages applied to the electron gun can be limited and hence the number of electric feedthroughs can be limited too. Connection elements are present between the voltage divider and one or more than one electrodes of the electron gun. Such connection elements are electrically connected to the voltage divider via the second layer and the diffusion bond between the first and the second layer. This embodiment of the invention provides a reliable electron gun which can be manufactured in a simple manner and which comprises a voltage divider. The invention has the further advantage that the connections can be very accurately made at relatively low temperatures and in a small area. The connection element can be, for example, a conductive strip between the first layer and the electrode. One end portion of the strip is provided with a second layer and the end portion is connected to the first layer by means of a diffusion bond and the other end portion is connected to the electrode by means of laser welding. In another embodiment the connection element is, for example, a pill-shaped element which is provided, on at least a side facing the first layer, with the second layer and which is connected, on the opposite side, to an end portion of a conductive strip, for example by means of laser welding. The other end portion of the conductive strip is connected to the electrode. Alternatively, the connection element can be given such a shape, for example a U Shape, that a diffusion band is formed at more then one location, for example at the underside and upperside of the ceramic element. In such an embodiment, the risk that the connection element becomes detached from the ceramic element is minimal.

The invention also relates to a method of interconnecting a ceramic element and a conductive element, a first layer comprising a first metal and a filler being applied to one of the elements, a second layer comprising a second metal being applied to the other element and, subsequently, the first and the second layer being pressed together, thereby forming a diffusion bond.

Using the method in accordance with the invention, a heat-resistant connection can be made in a simple manner.

Preferably, the first and the second metal are selected from the group consisting of copper, gold and silver. In this case, rapid diffusion at relatively low temperatures (for example approximately 400° C. to approximately 500° C.) is possible.

A preferred embodiment of the invention is characterized in that the first and the second metal are selected from the group consisting of silver and gold. These elements do not oxidize, so that the bonding between the first and the second layer is improved.

The first and the second metal may be identical, but they may also be different.

Preferably, the first layer is applied to the ceramic element.

The first layer can be provided in a simple manner by means of screen printing.

These and other aspects of the invention will be explained in greater detail by means of an example and with reference to the accompanying drawing, in which FIG. 1 is a sectional view of a cathode ray tube;

Figure 6A:
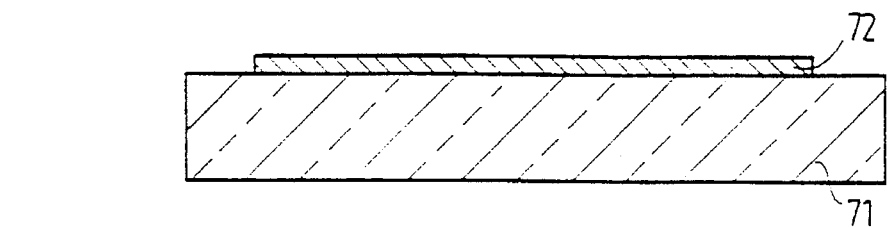
Figure 6B:
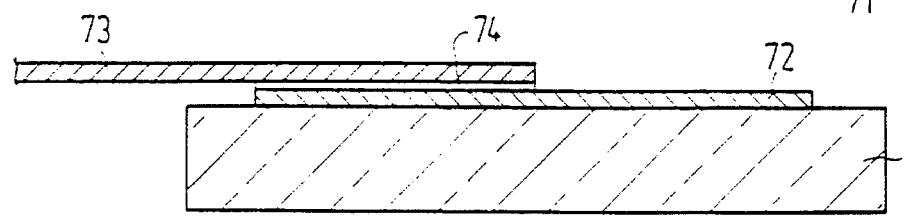

FIGS. 6a and 6b diagrammatically show the method according to the invention.

The Figures are diagrammatic and are not drawn to scale; identical elements are generally referred to by the same reference numerals.

Vacuum tube 1, in this example a colour cathode ray tube (FIG. 1), has an evacuated envelope 2 comprising a display window 3, a cone portion 4 and a neck 5. In the neck 5 there is provided an electron gun 6 for generating, in this example, three electron beams 7, 8 and 9. A phosphor screen 10 is present on the inside of the display screen. The phosphor screen 10 has a phosphor pattern of phosphor elements luminescing in red, green and blue. On their way to the phosphor screen 10 the electron beams 7, 8 and 9 are deflected across the phosphor screen 10 by means of deflection unit 11 and pass through a colour selection electrode 12 arranged in front of the phosphor screen 10, which colour selection electrode 12 comprises a thin plate 13 having apertures 14. The colour selection electrode is suspended in the display window by means of suspension means 15. The three electron beams 7, 8 and 9 pass through the apertures of the colour selection electrode at a small angle with respect to each other and, consequently, each electron beam impinges on phosphor elements of only one colour.

Figure 1:
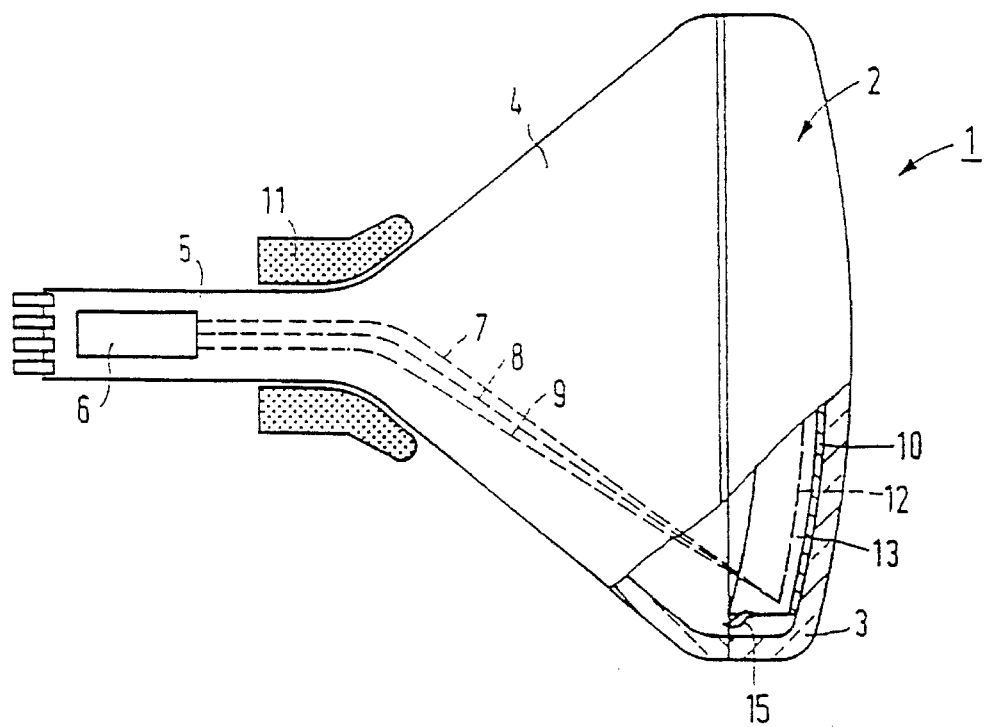
Figure 2:
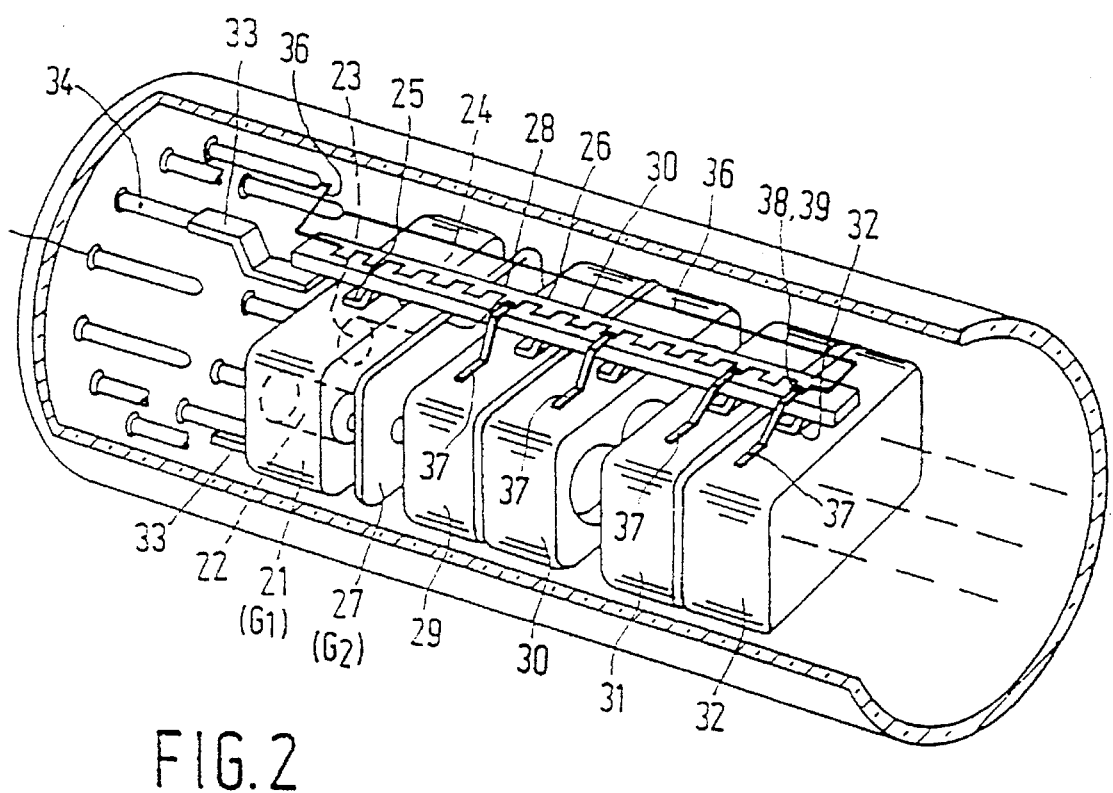
FIG. 2 is a partly perspective elevational view of a detail of an embodiment of the cathode ray tube according to the invention.

FIG. 2 is a partly perspective elevational view of a detail of the cathode ray tube shown in FIG. 1. Electron gun 6 comprises a common control electrode 21, also referred to as $G_1$ electrode, in which three cathodes 22, 23 and 24 are secured. In this example, the $G_1$ electrode is secured to ceramic carriers 26 by means of braces 25. In this example, the electron gun 6 further comprises a common plate-shaped electrode 27, also referred to as $G_2$ electrode, which, in this example, is secured to ceramic carriers 26 by means of braces 28. In this example, the electron gun comprises two ceramic carriers 26. One of the careers is shown, the other is situated on the side of the electron gun 6 which is invisible in this perspective view. The electron gun 6 further comprises common electrodes 29 up to and including 32 which are secured to the carriers 26 also by means of braces. In this example, the carriers 26 are secured to feedthrough pins 34 by means of supports 33. One or both carriers 26 are provided with a resistance pattern 35 which, in this example, is connected to two of the feedthrough pins 34 by means of connections 36. One of the connections can be connected to a conductive layer on the inside of cone 4. Connection elements 37, in this example conductive strips, are secured to the electrodes 29 up to and including 32. A voltage divider is formed by this construction. The end portions 38 of the connection elements 37 are provided with a layer 39 comprising a second metal, preferably copper, silver or gold. The portions of the resistance pattern corresponding to the end portions 38 are connected to the end portions 38 by means of a diffusion bond. At least these portions 39 of the resistance pattern comprise a first metal, preferably silver, gold or copper, and a filler.

Figure 3A:
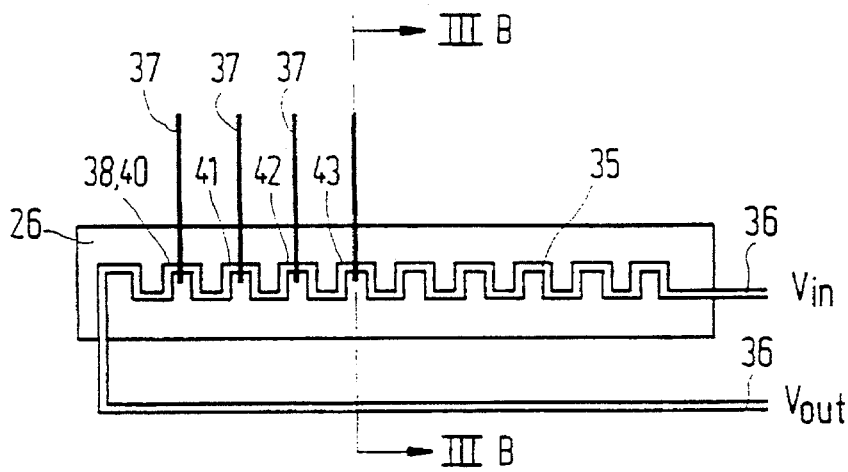
FIGS. 3a and 3b are a top view and a sectional view, respectively, of a further detail of the cathode ray tube shown in FIG. 2.
Figure 3B:
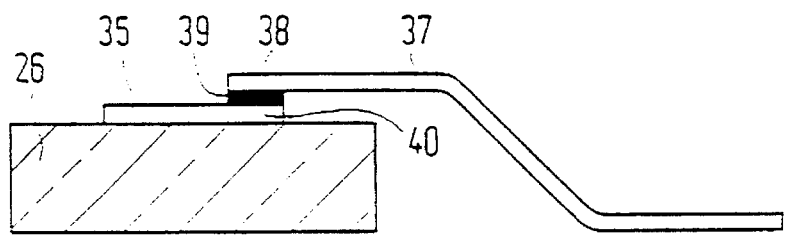

FIG. 3a is a top view of a resistance pattern 35 provided on a carrier 26. The voltage varies from $V_{in}$ at the beginning of the resistance pattern to $V_{out}$ at the end of the resistance pattern. Connection elements 37 are connected to the resistance pattern at the location of reference numerals 40 up to and including 43. The bonds formed by diffusion can withstand high temperatures. FIG. 3b is a sectional view of a bond. In this example, parts 40 of the resistance pattern are formed by a first layer and the remainder of the resistance pattern 35 is formed by a resistance material.

The invention is not limited to this example. In other embodiments the meanders of the resistance pattern are formed by resistance material, for example a glass comprising a very small quantity of conductive material (for example $RuO_2$) and branches of resistance material are present in various places of the meander, the ends of the branches being covered with a first layer, or the branches partly covering a first layer. In such embodiments, a connection element is secured on the first layers at the ends of the branches, for example in the same manner as shown in FIG. 3b. In the example shown in FIG. 3b there is one connection element 37 between the first layer and the electrode and the connection element 37 is connected to a first layer. The invention is not limited to this example. For example, a conductive, for example pill or plate-shaped, additional connection element may be present between the first layer and the conductive connection element 37. In such embodiments the side of the further connection element facing the first layer is provided with a second layer and the first and the second layer are interconnected by means of a diffusion bond. On another side, for example the opposite side with respect to the second layer, of the further connection element, said connection element is connected to a connection element 37, for example by means of laser welding.

The invention is of particular importance if more than three electrodes are connected to the voltage divider.

Figure 4:
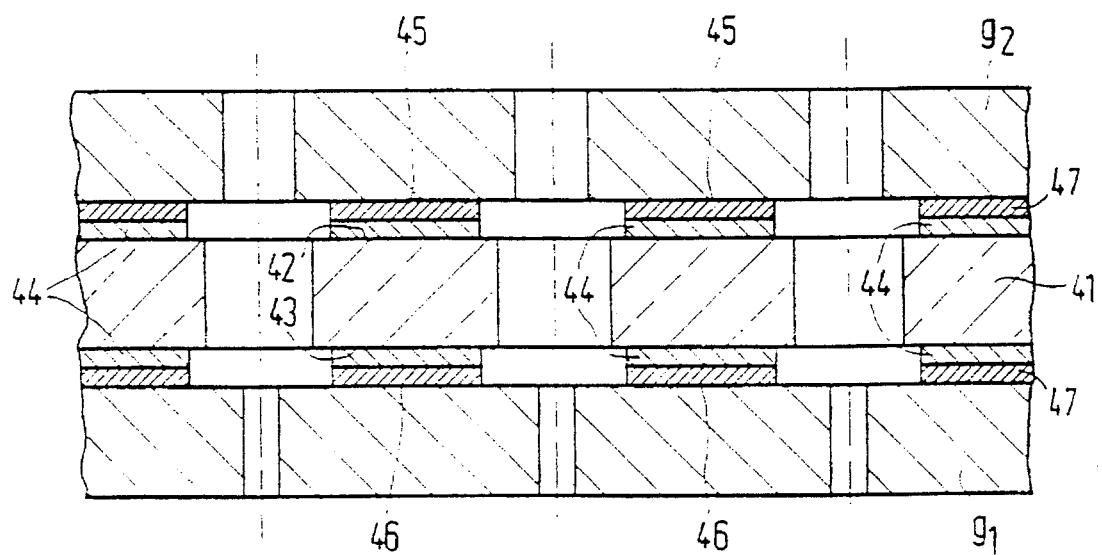
FIG. 4 is a partly perspective elevational view of a detail of an embodiment of the cathode my tube according to the invention.

FIG. 4 is a diagrammatic sectional view of a detail of an embodiment of the invention. It shows, inter alia, the $G_1$-electrode and the $G_2$-electrode. A ceramic spacer 41 is present between these electrodes. The sides 42 and 43 facing the $G_1$ and $G_2$ electrodes are provided with a layer 44 comprising, for example, silver and a filler. The sides 45 and 46 of the $G_1$ electrode and $G_2$ electrode face the ceramic element 41 and are provided with a layer 47 comprising copper, silver or gold. The layers 44 and 47 are interconnected by means of diffusion. In this Figure the thicknesses of the layers are not drawn to scale.

The $G_1$ and $G_2$ electrodes can be individually connected to the carriers 26.

Figure 5A:
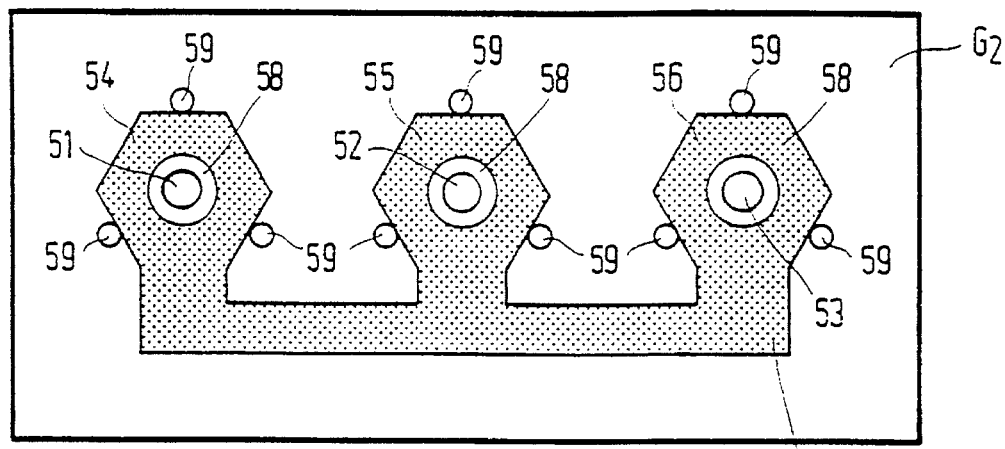
FIGS. 5a and 5b show a further detail of the cathode ray tube shown in FIG. 4.
Figure 5B:
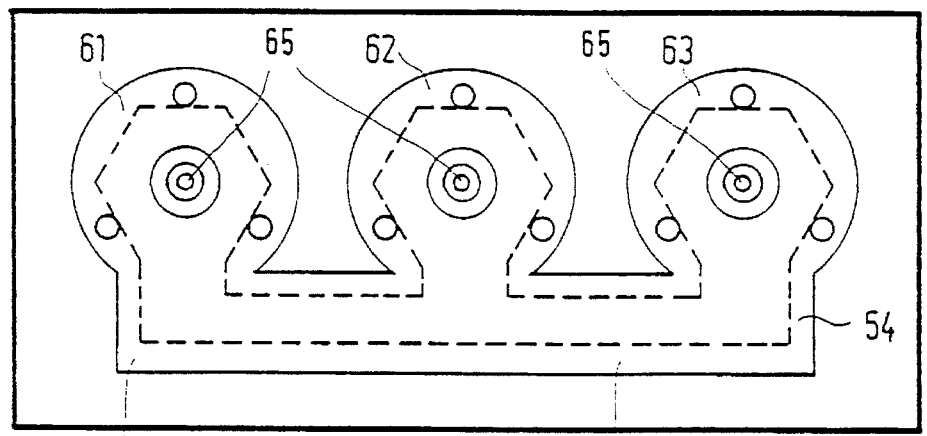

FIGS. 5a and 5b are top views of a detail of a further embodiment of a cathode ray tube according to the invention. In this example the $G_1$ and $G_2$ electrodes form an assembly and are interconnected by means of a ceramic spacer.

In this example the $G_2$ electrode is plate-shaped and has three apertures 51, 52 and 53. Between the $G_1$ electrode and the $G_2$ electrode there is provided a ceramic spacer 50 comprising three, in this example approximately hexagonal portions 54 up to and including 56, which are interconnected by a crosspiece. Each of the parts 54 up to and including 56 has an aperture 58. The $G_2$ electrode has alignment means, in this example pins 59, which determine the positions of the parts 54 up to and including 56 relative to the apertures 51 up to and including 53. FIG. 5a shows the $G_2$ electrode comprising the ceramic spacer. FIG. 5b shows that the $G_1$ electrode 60 is secured on the spacer. The $G_1$ electrode comprises three parts 61 up to and including 63 which are interconnected by a crosspiece 65. Each of the parts 61 up to and including 63 has an aperture 64. The $G_1$ and $G_2$ electrodes are connected to the ceramic spacer 50 by means of a diffusion bond between first metal-containing glass layers, provided on the ceramic spacer, and second metal layers applied to the electrodes. The first metal may be, for example, silver and the second metal may be, for example gold. The ceramic element preferably consists largely of $Al_2O_3$.

FIGS. 6a and 6b diagrammatically show an embodiment of the method in accordance with the invention.

On ceramic element 71 there is provided a first metal-containing layer 72 (FIG. 6a), for example Dupont conductor composition No. 6610QS175 and QM14, which are silver-containing glass pastes. Further examples of suitable glass pastes are Dupont conductor composites 9910, containing gold, and QS190 and QP152 which contain copper. The copper-containing compositions must be annealed in an inert gas (for example nitrogen) at temperatures which are higher than the temperatures for the gold or silver-containing glass pastes. The first layer 72 is provided, for example, by means of screen printing, stamping or transfer printing. Subsequently, the layer is dried, for example at a temperature of 130° C., for approximately ten minutes after which the layer is annealed, for example at a temperature of approximately 850° C. for approximately ten minutes. By virtue thereof, layer 72 bonds to the ceramic element 71. The ceramic element 71 preferably consists predominantly of $Al_2O_3$. This material can withstand high temperatures and can readily be given all kinds of shapes. Preferably, the filler serves also as a bonding agent for bonding the first metal-containing layer 72 to ceramic element 71. The filer is, for example, an oxide, such as glass. An oxide bonds well to ceramic materials, such as $Al_2O_3$.

Subsequently, (FIG. 6b) a conductive element 73 carrying a layer 74 which contains silver, gold or copper, is provided on layer 72 in such a manner that the layers 72 and 74 contact each other. Next, a diffusion bond is realised at an increased temperature, for example a temperature ranging between approximately 400° C. and approximately 500° C. Preferably, the layers are pressed together, for example at a pressure of approximately 500 atm, during the formation of the diffusion bond. The method shown can be used for the manufacture of a cathode ray tube as described hereinabove, but the method is not limited thereto. For example, by means of this method connections which are resistant to high temperatures can be formed at voltage dividers.

It will be obvious that within the scope of the invention many variations are possible to those skilled in the art.

We claim:

1. A method of interconnecting a ceramic element and a conductive element comprising the steps of:

a. applying to the ceramic element a first layer of a material including a metal and a filler comprising a bonding agent for bonding the first layer to the ceramic element;

b. applying to the conductive element a second layer of a material including a metal; and c. pressing the first and second layers together to form a diffusion bond.

2. A method as in claim 1 including the step of annealing the first layer.

3. A method as in claim 1 where the filler comprises a paste.

4. A method as in claim 1 where the filler comprises an adhesive.

5. A method as in claim 4 where the filler comprises an oxide.

6. A method as in claim 5 where the filler comprises a glass.

7. A method as in claim 1 where the first layer is applied to the ceramic element by screen printing.

8. A method as in claim 1 where the first layer is applied to the ceramic element by stamping.

9. A method as in claim 1 where the first layer is applied to the ceramic element by transfer printing.

10. A method of interconnecting a ceramic element and a conductive element comprising the steps of:

a. screen printing onto the ceramic element a first layer of a material including a metal and a filler;

b. applying to the conductive element a second layer of a material including a metal; and c. pressing the first and second layers together to form a diffusion bond.

11. A method as in claim 10 where the filler comprises a bonding agent for bonding the first layer to the ceramic element.

12. A method as in claim 10 including the step of annealing the first layer.

13. A method as in claim 10 where the filler comprises a paste.

14. A method as in claim 10 here the filler comprises an adhesive.

15. A method as in claim 14 where the filler comprises an oxide.

16. A method as in claim 15 where the filler comprises a glass.

* * * * *